UNITED STATES PATENT OFFICE.

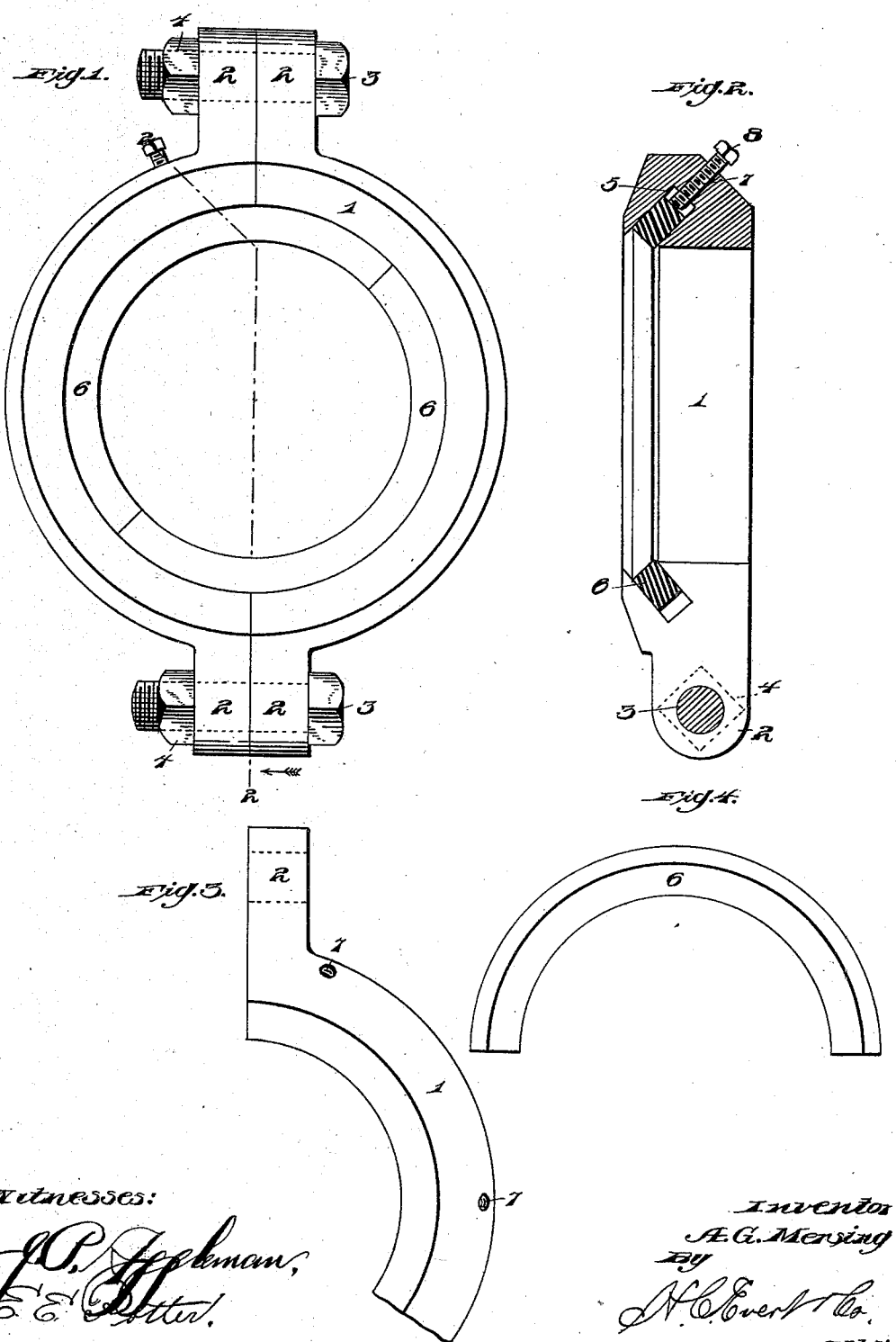

ARTHUR GUSTAV MERSING, OF THOMAS, WEST VIRGINIA.

PIPE-COUPLING.

SPECIFICATION forming part of Letters Patent No. 716,260, dated December 16, 1902.

Application filed October 3, 1901. Serial No. 77,486. (No model.)

*To all whom it may concern:*

Be it known that I, ARTHUR GUSTAV MERSING, a citizen of the United States of America, residing at Thomas, in the county of Tucker and State of West Virginia, have invented certain new and useful Improvements in Pipe-Couplings, of which the following is a specification, reference being had therein to the accompanying drawing.

This invention relates to certain new and useful improvements in pipe-couplings, and relates more particularly to a clamp employed for preventing leaks in gas-pipes, water-mains, steam-lines, and the like.

The invention has for its object the provision of novel means to construct a clamp to be secured upon pipes where they are screwed together into a fitting sleeve or flange, making a more secure joint and preventing any possibility of leakage.

The invention has for its further object to construct a device of the above-described class that will be extremely simple, strong, durable, comparatively inexpensive to manufacture, and highly efficient in its use.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a top plan view of my improved pipe-coupling. Fig. 2 is a vertical sectional view taken on the line 2 2 of Fig. 1. Fig. 3 is a top plan view of a portion of the clamp. Fig. 4 is a plan view of one section of the adjustable ring.

In the drawings the reference-numeral 1 indicates the clamp, formed in two sections, said sections carrying at diametrically opposite points on their periphery apertured lugs 2 for the reception of bolts 3 and nuts 4, serving to secure the sections of the clamp together. In said sections of the clamp is formed an interior annular groove 5, which extends at an angle inwardly and having one of its outer edges terminating at a point on the inner face or bore of the clamps and the other merging in the side or edge of the clamp, as shown in Fig. 2 of the drawings. In said groove is secured a ring formed in two sections 6. Communicating with said annular recess 5 are screw-threaded openings 7, formed in the body portion of the clamp-sections to receive set-screws 8. A number of these openings 7 and set-screws 8 are formed in the sections of the clamp. The clamp is arranged upon the sleeve or fitting in the ordinary manner, and the set-screws 8 are tightened, thereby wedging the ring firmly upon the sleeve or coupling at a point within the interior of the clamp and tightening the joint, in such a manner that leakage will be impossible.

The manner of removing the clamp will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

A coupling comprising two sections provided at diametrically opposite points with outwardly-extending lugs, with openings for the reception of securing-bolts, said sections provided adjacent one of their edges with an inwardly-inclined annular groove, said groove having flat parallel side walls, the inner edge of which terminates at a point on the interior of the coupling and the lower edge of the outer wall merging in the adjacent side of the clamp, a ring composed of two sections having flat parallel sides secured in said groove, the sides of said ring engaging and being guided by the side walls of the groove, and inclined set-screws in said sections and having their inner ends projecting within the rear end of the groove, and engaging the ring whereby the ring can be forced outward and engage the pipe at a point intermediate the sides of the coupling, substantially as described.

In testimony whereof I affix my signature in the presence of two witnesses.

ARTHUR GUSTAV MERSING.

Witnesses:
M. T. BLIZZARD,
D. W. MASON.